United States Patent [19]

Pück et al.

[11] Patent Number: 4,622,086
[45] Date of Patent: Nov. 11, 1986

[54] METHOD OF FABRICATING A HOLLOW BODY

[75] Inventors: Alfred Pück, Am Ahlberg 33, 3524 Immenhausen-Mariendorf; Thomas Rau, Liebenau/Niedermeiser, both of Fed. Rep. of Germany

[73] Assignee: Alfred Pück, Immenhausen-Mariendorf, Fed. Rep. of Germany

[21] Appl. No.: 771,602

[22] Filed: Sep. 3, 1985

[30] Foreign Application Priority Data

Sep. 7, 1984 [DE] Fed. Rep. of Germany ....... 3432905

[51] Int. Cl.$^4$ ........................................... B65H 81/00
[52] U.S. Cl. .................................. 156/166; 156/169; 264/340
[58] Field of Search ............... 156/169, 172, 173, 175, 156/166, 161, 162, 165, 160, 156; 264/231, 232, 33, 340

[56] References Cited

U.S. PATENT DOCUMENTS 2,984,870  5/1961  Warnken ............................ 156/165
3,033,730  5/1962  Martin ................................ 156/165
4,217,158  8/1980  Puck .................................. 156/156

Primary Examiner—Michael Ball
Attorney, Agent, or Firm—Werner W. Kleeman

[57] ABSTRACT

In this method of fabricating a hollow body, a first layer of fiber-reinforced hard-elastic plastic is formed to produce an inner layer of the hollow body with the fibers of the fiber-reinforced hard-elastic plastic extending skew to the longitudinal axis of the hollow body within a predetermined range of fiber orientation angles. A second outer layer of fiber-reinforced hard-elastic plastic is formed around the inner layer with the fibers oriented in a predetermined different range of fiber orientation angles. At least one of the layers is heated to a desired elevated temperature. At least one of the layers is subjected to a predetermined force or combination of forces. The hollow body is then cooled to the hard-elastic state, locking internal stresses into the two layers when the applied forces are removed. The resulting structure is internally stressed or pre-stressed and therefore particularly well suited to alternating directions of loading or, according to the orientation of the fibers produced, to resisting variable loads in a given direction.

29 Claims, 2 Drawing Figures

METHOD OF FABRICATING A HOLLOW BODY

BACKGROUND OF THE INVENTION

The present invention broadly relates to a method of fabricating a hollow body and, more specifically, pertains to a new and improved method of fabricating hollow bodies such as tubes, tubular torsion bars, pressure vessels and the like built-up from fiber-reinforced plastic.

Generally speaking, the method of the present invention is for fabricating a hollow body, especially tubes, tubular torsion bars, pressure vessels and the like built-up from fiber-reinforced plastic material, especially duroplastic or thermosetting plastic material, and having at least two layers of fibers, especially glass fibers, carbon fibers, aramide fibers and the like, mutually differently oriented in relation to a longitudinal axis of the hollow body. The fibers of the hollow body to be fabricated extend at least partially in each such differently oriented extension over the entire hollow body. The layers comprise a first plastic which at least at a foreseen service temperature is hard-elastic. One step of the method of the present invention entails subjecting the at least two layers to forces during a hard-elastic mutual bonding of the at least two layers to one another.

The fabrication of extremely light, yet highly structurally resistant, structural elements has long been strived for. This combination of properties can be obtained by employing fiber-reinforced plastics. These materials and the structural elements fabricated from them have primarily the advantage that very high strength or resistance to loading in the direction of fiber orientation can be achieved at low density. They have on the other hand the serious disadvantage of a very low strength or resistance to loading in a direction transverse to fiber orientation and an extremely low elongation at failure. It has long been attempted to overcome these deficiencies by employing more suitable plastics, especially plastics having increased elongation at failure. However, by selectively incorporating internal stresses or pre-stressing of a nature favorable in relation to the loading conditions, improvements can be obtained which amount to much more than the improvements obtainable by exchanging or modifying the plastic material.

A method of this type for fabricating plastic tubes or pipes is known from the German Pat. No. 2,842,531 in which a double-layered tube is built-up. First, an inner tube is fabricated having fibers extending essentially in the circumferential direction such that the fibers include an angle of essentially 90° with the longitudinal direction or axis of the tube. Deviations from this orientation are only required to permit a continuous fiber to be wound or coiled around the tube in a slight lead or pitch angle. This tube is hardened or cured and a pressure medium is introduced into its interior while an axially effective compression force is applied to it simultaneously from the exterior. The plastic which bonds the individual fibers together is a hard-elastic plastic material and consequently an elastic deformation arises. A second tube layer containing glass fibers is applied to the thus elastically deformed body with the glass fibers oriented in essentially the axial direction. This second tube or tube layer, which is bound to the first tube, for instance by the hard-elastic plastic material, is also hardened, and the first tube or tube layer is subsequently relieved of the pressure medium and of the compressive force in the axial direction. During this relieving or unloading procedure, the inner tube can only partially relax since oppositely oriented tensile forces arise in the outer tube or tube layer during this procedure. The desired compressive stresses transverse to the direction of fiber orientation remain as internal stresses or pre-stressing at least in the inner tube or tube layer.

In soft-elastic or resilient tubes or hoses built-up from, for instance, resilient polyvinyl chloride, rubber or the like, it is known to provide reinforcement layers or inserts which assume an orientation of essentially about 55° to the longitudinal axis. For instance, a woven mesh or fabric can be provided which exhibits equal angles of different sign.

SUMMARY OF THE INVENTION

Therefore, with the foregoing in mind, it is a primary object of the present invention to provide a new and improved method of fabricating a hollow body which does not exhibit the aforementioned drawbacks and shortcomings of the prior art constructions.

Another and more specific object of the present invention aims at providing a new and improved method of fabricating a hollow body, especially tubes, torsion tubes or tubular torsion bars, pressure tubes or conduits, pressure vessels and the like which permits fabricating such a hollow body in a simple and easily reproducible manner and in which tensile and compressive loads can be uniformly distributed in the various layers of the hollow body.

A further significant object of the present invention aims at providing a new and improved method of fabricating a hollow body in which different angles of orientation of the fibers can be obtained during fabrication.

Now in order to implement these and still further objects of the invention, which will become more readily apparent as the description proceeds, the method of the present invention is manifested by the features that it comprises the steps of: fabricating at least two layers with the fiber-reinforced hard-elastic plastic to form at least two fiber-reinforced layers; bonding the at least two layers together; subsequently heating the hard-elastic plastic bonding the at least two layers between the at least two layers; subsequently subjecting at least one fiber-reinforced layer of the at least two fiber-reinforced layers to at least one force; and cooling the at least one fiber-reinforced layer in this state to below the glass transition temperature.

Since the plastic can be rendered soft-elastically or resiliently deformable or plastic simply by the effect of heat, forces can be introduced into the already completely formed hollow body in a simple manner which leads to the desired internal stress conditions or pre-stressing state after cooling of the hollow body and removal of the forces. Different winding angles of multiple layers of various thicknesses and layerings woven into one another can be achieved so that a ready adaptation to working conditions and the geometric form of the hollow body can be carried out, since the form of the hollow body is a determinate factor of the optimum winding angle.

If the hollow body is heated and the inner wall of the hollow body is subjected to a radially outwardly directed pressure force, for instance by a pressure medium, and the hollow body is subjected to a tensile force which, in total and seen from an absolute point of view, is at most as great as a radially outwardly directed pressure force during cooling to the hard-elastic state of the plastic while the angles of fiber orientation in relation to the longitudinal axis of the hollow body lie within a range between about 55° and about 75°, then a hollow body can be obtained which is particularly well suited for resisting internal pressure while its resistance to axial and circumferential stresses can be approximately undiminished. Such tubes are, for instance, employed as pipes or conduits, flexible or resilient torsion shafts, and so forth.

If the hollow body is heated and the inner wall of the hollow body is subjected to a radially outwardly directed pressure force, for instance by a pressure medium, and to a tensile force effective in the axial direction during cooling to the hard-elastic state of the plastic while the angles of fiber orientation in relation to the longitudinal axis of the hollow body lie within a range of between 10° and 55°, then a particularly bending-resistant body is obtained such as is, for instance, advantageous for rigid or bending-resistant torsion shafts or bars and the like. If the angle is about 45°, then a torsion shaft or bar is obtained which is suitable for loadings in alternating directions of rotation with a moderate rigidity or resistance to bending.

An ideal internal pressure container or vessel is obtained when the hollow body is heated and the inner wall of the hollow body is subjected to a radially outwardly effective pressure force, especially to a pressure medium, during cooling to the hard-elastic state of the plastic while the angle of fiber orientation in relation to the longitudinal axis of the hollow body amounts to about 55°.

If the hollow body is heated and is supplementarily subjected to a torsional moment during cooling to the hard-elastic state of the plastic, then pre-stresses or pre-stressing forces can be introduced into a single layer, which can be of particular advantage in cases of extreme torsion loading in a single direction.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
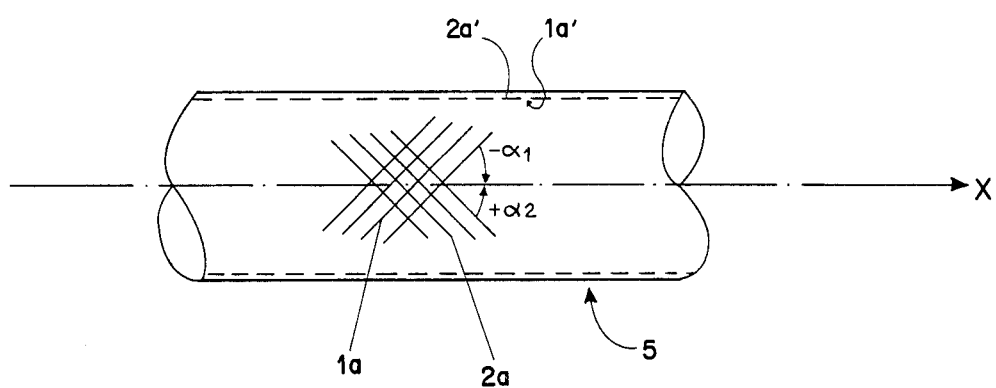
FIG. 1 schematically shows a tube having two layers with different angles of fiber orientation in relation to the longitudinal axis.

Describing now the drawings, it is to be understood that to simplify the showing thereof only enough of the structure of the apparatus for fabricating hollow bodies has been illustrated therein as is needed to enable one skilled in the art to readily understand the underlying principles and concepts of the present invention. Turning now specifically to FIG. 1 of the drawings, a tube or hollow body 5 fabricated according to the method of the invention will be seen to comprise two layers 1a and 2a of fiber-reinforced hard-elastic plastic material. The fibers of the inner layer 1a exhibit a first angle $\alpha_1$ of fiber orientation in relation to the longitudinal axis x of the hollow body. The fibers of the outer layer 2a exhibit a second angle $\alpha_2$ of fiber orientation in relation to the axis x. It will be seen that the first angle $\alpha_1$ has been given a negative algebraic sign in FIG. 1 and the second angle $\alpha_2$ a positive algebraic sign. The layers 1a and 2a are mutually bonded at mutually adjacent boundary regions 1a' and 2a' thereof, respectively.

Figure 2:
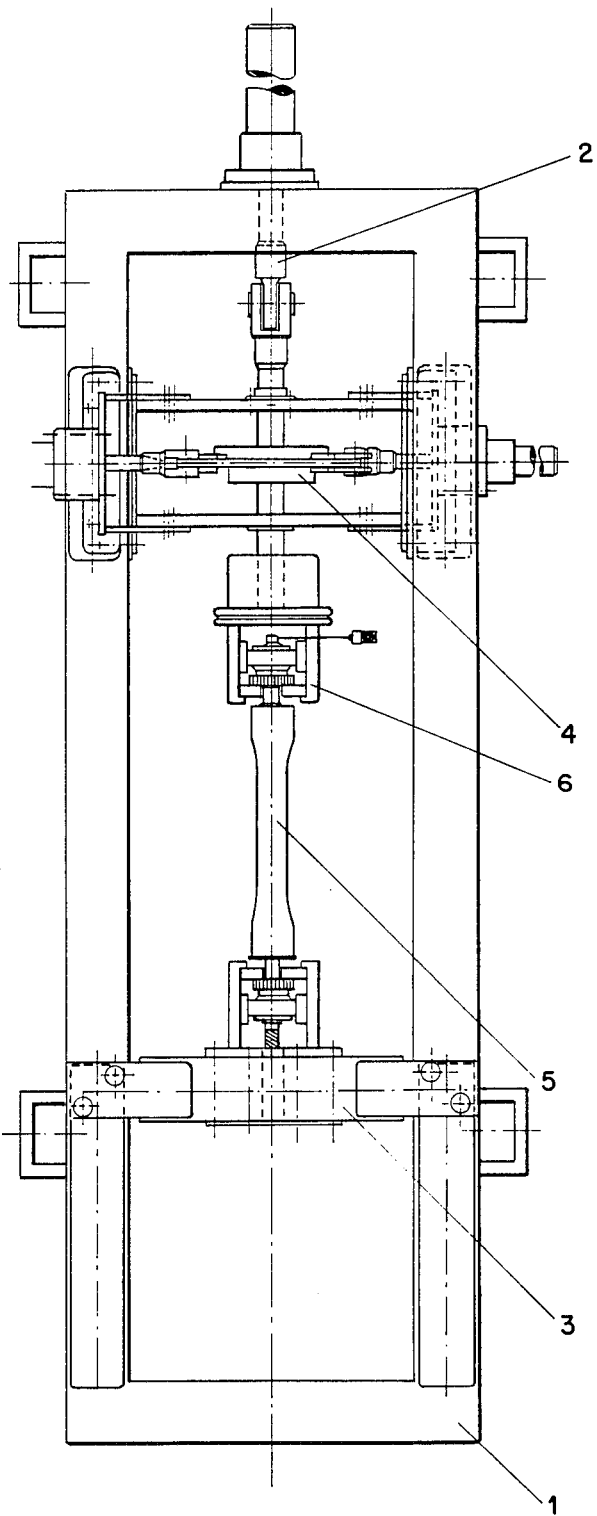
FIG. 2 schematically shows an apparatus for generating desired internal stresses in a hollow body or tube.

Turning now specifically to FIG. 2 of the drawings, the apparatus illustrated therein by way of example and not limitation and employed to realize the method as hereinbefore described will be seen to comprise a frame 1 and a tension and compression loading unit 2 movably mounted upon the frame 1 for generating the axial forces employed in the method of the invention. A counter-support or counterbearing 3 is also mounted on the frame 1. The required torsional moment is generated by a torsion loading unit 4. The hollow body is designated with the reference numeral 5. This hollow body 5 is subjected to the desired internal pressure by a chuck jaw arrangement or expanding mandrel 6. The internal pressure can alternatively be applied by a pressure medium.

The invention will be further described based upon the following Examples:

EXAMPLE 1

A layer 1 mm in thickness was applied to a winding mandrel or core at a winding angle of +45° according to Example 1 in Table 1. This layer comprised fibers having a fiber diameter of 10μ. The inner diameter of the tube was 25 mm. A further layer of glass fiber-reinforced plastic 1 mm in thickness was applied to the first layer at a winding angle of −45°. An epoxide resin was employed as the binding resin or matrix, although other plastics, such as thermoplastics, could also have been used. The fibers were made of so-called E-glass. S-glass, aramide fibers, carbon fibers or the like could also be employed instead of E-glass.

The tube was left to harden, set or bond and after complete hardening, setting or bonding heated to 150° C., i.e. up to the glass transition temperature, and subjected to a pressure of 138 bar in the apparatus of FIG. 2. An axial tensile force of 8.5 kN and additionally a torsional moment of 229 Nm were simultaneously applied.

The maximum torque was determined for a tube fabricated according to this Example 1 and for an identical tube fabricated without the steps of the inventive method. In the tube according to the invention, the maximum torque was 860 Nm while in the other, it was 268 Nm. Thus, an increase of about 300% was achieved by the method according to the invention.

EXAMPLE 2

Tubes were fabricated with and without the employment of the method according to the invention, analogous to Example 1 but employing the parameters according to Example 2 of Table 1. The maximum torque was determined. The tube fabricated according to the inventive method displayed a maximum torque of 520 Nm, while the other tube displayed a maximum torque of only 260 Nm. Thus, a doubling of the mechanical properties was achieved.

EXAMPLE 3

The procedure followed that of Example 1 but the parameters according to Example 3 of Table 1 were employed. The tube obtained according to this Example is suitable for a torque which acts intermittently in a single direction. An increase of the torque from 245 Nm to 430 Nm was achieved by the method according to the invention.

EXAMPLE 4

The procedure according to Example 1 was followed but the parameters according to Example 4 of Table 2 were employed. This tube is particularly suitable for loading by a torque alternating in its direction. The inventive method raised the maximum torque from 286 Nm to 572 Nm and thus achieved an increase of about 100%.

EXAMPLE 5

The procedure according to Example 1 was followed but the parameters according to Example 5 of Table 2 were employed. A tube for high internal pressure loading was obtained. The inventive method achieved an increase from 43 bar to 170 bar for the maximum internal pressure. Thus, approximately a quadrupling of the maximum internal pressure was obtained.

EXAMPLE 6

The procedure according to Example 1 was followed but the parameters according to Example 6 in Table 2 were employed. A tube of this type is suitable for internal pressure loading. An increase of the maximum internal pressure from 38 bar to 115 bar was obtained by the inventive method. Thus, approximately a tripling of the maximum internal pressure was achieved.

The so-called E-glass which may be employed for the fibers is an alkali-free boric aluminum silicate glass material having a maximum alkali content of 1%, which is particularly well suited for reinforcing plastic materials. So-called S-glass may also be employed and is a common alkali glass material having augmented strength properties, as is commercially available from Corning Glass of Corning, New York.

The epoxide which may be employed as a bonding matrix for the fibers may be an epoxy plastic resin based upon the chemical Bisphenol-A. Heating such an epoxide above the glass transition temperature significantly reduces its modulus of elasticity. In the tabulated Examples 1 through 6, an epoxy resin commercially available under the trade name Araldite from Ciba-Geigy of Basel, Switzerland, was employed.

As an alternative to the expanding jaw chuck or mandrel 6, a pressure medium such as a hydraulic oil may be introduced into the interior of the hollow body 5 at a predetermined temperature and pressure. The temperature of the pressure medium may, if desired, be adapted to support or effect the heating of the hollow body 5. In order to avoid penetration of the pressure medium through a possibly pervious or possibly porous layer 1a or 2a, a resilient foil such as a rubber foil may be interposed between the pressure medium and the inner wall of the hollow body 5.

TABLE 1

| PARAMETER | EXAMPLE 1 | EXAMPLE 2 | EXAMPLE 3 |
|---|---|---|---|
| Layer 1: | | | |
| Layer Thickness (mm) | 1 | 1 | 1 |
| Winding Angle | +45° | +54.74° | +60° |
| Layer 2: | | | |
| Layer Thickness (mm) | 1 | 1 | 1 |
| Winding Angle | −45° | −54.74° | −60° |

TABLE 1-continued

| PARAMETER | EXAMPLE 1 | EXAMPLE 2 | EXAMPLE 3 |
|---|---|---|---|
| Fiber Type | E-Glass | E-Glass | E-Glass |
| Resin Type | Epoxide | Epoxide | Epoxide |
| Loading Temperature (°C.) | 150 | 150 | 150 |
| Tube I.D. (mm) | 25 | 25 | 25 |
| Wall Thickness (mm) | 2 | 2 | 2 |
| Internal Pressure (bar) | 138 | 184 | 207 |
| Axial Force (kN) | 8.5 | 0 | −4.25 |
| Torsional Moment (Nm) | 229 | 216 | 198 |

TABLE 2

| PARAMETER | EXAMPLE 1 | EXAMPLE 2 | EXAMPLE 3 |
|---|---|---|---|
| Layer 1: | | | |
| Layer Thickness (mm) | 1 | 1 | 1 |
| Winding Angle | +45° | +54.74° | +60° |
| Layer 2: | | | |
| Layer Thickness (mm) | 1 | 1 | 1 |
| Winding Angle | −45° | −54.74° | −60° |
| Fiber Type | E-Glass | E-Glass | E-Glass |
| Resin Type | Epoxide | Epoxide | Epoxide |
| Loading Temperature (°C.) | 150 | 150 | 150 |
| Tube I.D. (mm) | 25 | 25 | 25 |
| Wall Thickness (mm) | 2 | 2 | 2 |
| Internal Pressure (bar) | 276 | 368 | 414 |
| Axial Force (kN) | 17 | 0 | −8.5 |

While there are shown and described present preferred embodiments of the invention, it is to be distinctly understood that the invention is not limited thereto, but may be otherwise variously embodied and practiced within the scope of the following claims. Accordingly,

What we claim is:

1. A method of fabricating a hollow body, especially a tube, tubular torsion bar, pressure, vessel and the like, built-up with fiber-reinforced plastic material, and having at least two layers of fibers mutually differently oriented in relation to a longitudinal axis of the hollow body and the fibers of each layer extend at least partially in each such mutually different orientation over the entire hollow body and wherein the layers comprise a plastic which at least at a predetermined service temperature is hard-elastic, comprising the steps of:
    fabricating the at least two layers with the fiber-reinforced hard-elastic plastic to form at least two fiber-reinforced layers;
    mutually bonding the at least two layers by means of the hard-elastic plastic;
    subsequently heating at least said hard-elastic plastic bonding the at least two layers between the at least two layers;
    then subjecting at least one fiber-reinforced layer of said at least two fiber-reinforced layers to a least one force; and thereafter cooling said at least one fiber-reinforced layer to below the glass transition temperature and then relieving said at least one force thus providing a residual prestress in the hollow body.

2. The method as defined in claim 1, wherein:
said step of subjecting the at least two layers to at least one force entails subjecting at most one layer of the at least two layers to said at least one force.

3. The method as defined in claim 1, wherein:
said step of subjecting the at least two layers to at least one force entails subjecting at most one layer of the at least two layers to at least two forces.

4. The method as defined in claim 1, wherein:
said step of subjecting the at least two layers to at least one force entails subjecting the at least two layers to a radially effective pressure defining said at least one force.

5. The method as defined in claim 1, wherein:
the at least two layers are disposed in direct superposition.

6. The method as defined in claim 1, wherein:
the at least two layers are disposed in indirect superposition.

7. The method as defined in claim 1, wherein:
the at least two layers are disposed directly within one another.

8. The method as defined in claim 1, wherein:
the at least two layers are disposed indirectly within one another.

9. The method as defined in claim 1, wherein:
the at least two layers comprise a first layer and a second layer;
said first layer comprising fibers having a first orientation in relation to the longitudinal axis of the hollow body;
said second layer comprising fibers having a second orientation in relation to the longitudinal axis of the hollow body;
said first orientation defining a positive included angle in relation to the longitudinal axis of the hollow body; and
said second orientation defining a negative included angle in relation to the longitudinal axis of the hollow body.

10. The method as defined in claim 1, wherein:
said step of subsequently heating at least said hard-elastic plastic bonding the at least two layers and located between the at least two layers entails heating the hard-elastic plastic in the at least two layers.

11. The method as defined in claim 1, wherein:
said step of subsequently heating at least said hard-elastic plastic bonding the at least two layers and located between the at least two layers entails heating at least said hard-elastic plastic bonding the at least two layers located between the at least two layers to at least approximately the region of the glass transition temperature.

12. The method as defined in claim 1, wherein:
said step of subjecting at least one fiber-reinforced layer of said at least two fiber-reinforced layers to at least one force entails subjecting an inner one of said at least two fiber-reinforced layers to said at least one force.

13. The method as defined in claim 1, wherein:
the step of subjecting said at least one fiber-reinforced layer to at least one force entails subjecting an inner wall of the hollow body to a radially outwardly directed pressure force and subjecting the hollow body to a tensile force which is at most as great as said radially outwardly directed pressure force during said cooling step which entails cooling said at least two layers to the hard-elastic state of the plastic;
the different orientations of the fibers defining a range of angles of fiber orientation in relation to the longitudinal axis of the hollow body; and
said range of angles of fiber orientation lying between approximately 55° and approximately 75°.

14. The method as defined in claim 13, wherein:
said step of subjecting said inner wall to said radially outwardly directed pressure force entails subjecting said inner wall to the action of a pressure medium.

15. The method as defined in claim 1, wherein:
the step of subjecting said at least one fiber-reinforced layer to at least one force entails subjecting an inner wall of the hollow body to a substantially radially outwardly directed pressure force and to a tensile force acting substantially in an axial direction of the hollow body during said cooling step which entails cooling said at least two layers to a hard-elastic state of the plastic;
the different orientations of the fibers defining a range of angles of fiber orientation in relation to the longitudinal axis of the hollow body; and
said range of angles of fiber orientation lying between approximately 10° and approximately 55°.

16. The method as defined in claim 15, wherein:
said step of subjecting said inner wall to said radially outwardly directed pressure force entails subjecting said inner wall to the action of a pressure medium.

17. The method as defined in claim 1, wherein:
the step of subjecting said at least one fiber-reinforced layer to at least one force entails subjecting an inner wall of the hollow body to a radially and axially outwardly effective pressure force during said cooling step which entails cooling said at least two layers to a hard-elastic state of the plastic;
the different orientations of the fibers defining an angle of fiber orientation in relation to the longitudinal axis of the hollow body; and
said angle of fiber orientation being approximately 55°.

18. The method as defined in claim 17, wherein:
said step of subjecting said inner wall to said radially outwardly directed pressure force entails subjecting said inner wall to the action of a pressure medium.

19. The method as defined in claim 1, further including the step of:
additionally subjecting the hollow body to a torsional moment during said cooling step which entails cooling said at least two layers to a hard-elastic state of the plastic.

20. The method as defined in claim 2, further including the step of:
additionally subjecting the hollow body to a torsional moment during said cooling step which entails cooling said at least two layers to a hard-elastic state of the plastic.

21. The method as defined in claim 3, further including the step of:
additionally subjecting the hollow body to a torsional moment during said cooling step which entails cooling the at least two layers to a hard-elastic state of the plastic.

22. The method as defined in claim 4, further including the step of:
additionally subjecting the hollow body to a torsional moment during said cooling step which entails cooling said at least two layers to a hard-elastic state of the plastic.

23. The method as defined in claim 1, wherein:
said fiber-reinforced plastic material comprises a thermosetting plastic material.

24. The method as defined in claim 1, wherein:
said at least two layers of fibers comprise glass fibers.

25. The method as defined in claim 1, wherein:
said at least two layers of fibers comprise carbon fibers.

26. The method as defined in claim 1, wherein:
said at least two layers of fibers comprise aramide fibers.

27. A method of fabricating a hollow body having a longitudinal axis and built up from layers of fiber-reinforced plastic material wherein a predetermined orientation of the fibers in one layer differs from that of at least one other layer, comprising the steps of:
fabricating an inner layer of the hollow body from fiber-reinforced hard-elastic plastic material with fibers of said inner layer extending within a first predetermined range of angles in relation to the longitudinal axis of the hollow body;

fabricating at least one outer layer of the hollow body from fiber-reinforced hard-elastic plastic material with fibers of said at least one outer layer extending within a second predetermined range of angles in relation to the longitudinal axis of the hollow body and different from said first predetermined range of angles;

bonding said hard-elastic plastic material of a boundary region of said at least one outer layer to said hard-elastic plastic material of a neighboring boundary region of said inner layer;

then heating said hard-elastic plastic material of at least said boundary regions in order to relax the bond formed between said inner layer and said at least one outer layer;

then applying at least one force to at least one layer of said inner layer and said at least one outer layer;

cooling said inner layer and said at least one outer layer to a predetermined temperature; and then relieving said at least one layer of the action of said at least one force thus providing a residual prestress in the hollow body.

28. The method as defined in claim 27, wherein:
said at least one outer layer is fabricated subsequent to said inner layer.

29. The method as defined in claim 27, wherein:
said inner layer and said at least one outer layer are fabricated simultaneously.

* * * * *